(12) United States Patent
Wolff et al.

(10) Patent No.: US 6,652,629 B2
(45) Date of Patent: Nov. 25, 2003

(54) FILTER APPARATUS

(75) Inventors: Thomas Wolff, Münchberg (DE); Manfred Krull, Eckersdorf (DE)

(73) Assignee: Helsa-Werk Helmut Sandler GmbH & Co. KG, Gefrees (DE)

( * ) Notice: Subject to any disclaimer, the term of this patent is extended or adjusted under 35 U.S.C. 154(b) by 0 days.

(21) Appl. No.: 10/202,468

(22) Filed: Jul. 24, 2002

(65) Prior Publication Data
US 2003/0019361 A1 Jan. 30, 2003

(30) Foreign Application Priority Data

Jul. 26, 2001 (DE) .......................... 101 36 318
Oct. 10, 2001 (DE) .......................... 101 50 062

(51) Int. Cl.⁷ ............................................ B01D 53/04
(52) U.S. Cl. ..................... 96/131; 96/133; 96/149; 96/153; 55/385.3; 55/490; 55/523
(58) Field of Search ................... 96/131, 133, 134, 96/135, 137, 149, 153, 154; 55/385.3, 490, 514, 523, DIG. 33

(56) References Cited

U.S. PATENT DOCUMENTS

| | | | | |
|---|---|---|---|---|
| 3,019,127 A | * | 1/1962 | Czerwonka et al. | 428/338 |
| 3,025,233 A | * | 3/1962 | Figert | 210/502.1 |
| 3,217,715 A | * | 11/1965 | Berger et al. | 131/342 |
| 3,645,072 A | * | 2/1972 | Clapham | 96/153 |
| 3,687,297 A | * | 8/1972 | Kuhn et al. | 210/502.1 |
| 3,704,806 A | * | 12/1972 | Plachenov et al. | 206/204 |
| 3,721,072 A | * | 3/1973 | Clapham | 96/153 |
| 3,919,369 A | * | 11/1975 | Holden | 264/45.1 |
| 4,013,566 A | * | 3/1977 | Taylor | 502/62 |
| 4,220,553 A | * | 9/1980 | Krause | 502/402 |
| 4,677,086 A | * | 6/1987 | McCue et al. | 502/62 |
| 4,756,726 A | * | 7/1988 | Peace | 96/117.5 |
| 4,992,084 A | * | 2/1991 | Von Blucher et al. | 96/131 |
| 5,106,588 A | * | 4/1992 | Sims et al. | 422/180 |
| 5,332,426 A | * | 7/1994 | Tang et al. | 96/153 |
| 5,350,443 A | * | 9/1994 | von Blucher et al. | 96/135 |
| 5,395,428 A | * | 3/1995 | von Blucher et al. | 95/104 |
| 5,456,833 A | * | 10/1995 | Butcher et al. | 210/488 |
| 5,480,621 A | * | 1/1996 | Breuer et al. | 422/174 |
| 5,914,294 A | | 6/1999 | Park et al. | |
| 6,277,178 B1 | * | 8/2001 | Holmquist-Brown et al. | 96/135 |
| 6,277,179 B1 | * | 8/2001 | Reymonet | 96/153 |

FOREIGN PATENT DOCUMENTS

| | | |
|---|---|---|
| DE | 3838426 A1 | 5/1990 |
| EP | 0369267 A2 * | 5/1990 |
| GB | 2126123 A * | 3/1984 |

* cited by examiner

*Primary Examiner*—Robert H. Spitzer
(74) *Attorney, Agent, or Firm*—Hoffman & Baron, LLP

(57) ABSTRACT

Described is a filter apparatus (10) having an activated carbon molded body (12) with a honeycomb structure. The filter apparatus (10) has connection elements (16, 18) at the feed flow end and the discharge flow end. The activated carbon molded body (12) is provided in a sealing element which is sealingly connected to the two connection elements (16, 18). The sealing element (20) is formed by a shrink tube (22) into which the activated carbon molded body (12) is shrunk and which is shrunk sealingly on to the connection elements (16, 18). The activated carbon molded body (12) can be in one piece or can comprise at least two mutually spaced activated carbon body portions (42).

3 Claims, 5 Drawing Sheets

FILTER APPARATUS

This application claims priority pursuant to 35 U.S.C. §119 to German Application Nos. 101 36 318.4 and 101 50 062.9 filed on Jul. 26, 2001 and Oct. 10, 2001, respectively.

BACKGROUND OF THE INVENTION

The invention concerns a filter apparatus having an activated carbon molded body with a honeycomb structure, a connection element at the feed flow end and a connection element at the discharge flow end, and a sealing element which sealingly connects the two connection elements and in which the activated carbon molded body is enclosed, wherein the sealing element is formed by a shrink tube into which the activated carbon molded body is shrunk and which is shrunk sealingly on to the connection elements.

In accordance with the new LEV II standard (Low Emission Vehicle) for the emissions from motor vehicles, which applies as from the year 2004 in California and in what are referred to as the Green States of the USA for new vehicles, the level of emission of pollutants may only amount to a maximum of 30% of the emission levels which are allowed there today. In addition in California as from the year 2003 ten percent of the vehicle fleet of an automobile manufacturer must satisfy the ZEV standard (Zero Emission Vehicle). That statutory regulation is giving rise to problems for the manufacturers of tank venting systems. Known tank venting systems are equipped for example with an activated carbon loose bed filter through which the air displaced from the tank flows during the procedure of filling the vehicle tank. In that situation the activated carbon loose bed filter absorbs the fuel in the displaced air. During vehicle operation the flow through the activated carbon loose bed filter is then in the opposite direction and the filter experiences desorption again. The problem now is that after a tank-filling operation the vehicle is switched off at any later time so that the activated carbon loose bed filter cannot be desorbed. In that case the fuel diffuses in the activated carbon loose bed from the charged region into the less heavily charged or uncharged region on the discharge flow side, that is to say to the outlet of the tank venting system. Having arrived there the fuel desorbs out of the activated carbon and is discharged into the environment through the outlet of the venting system.

A commercially available average activated carbon loose bed filter with about 2.7 cm$^3$ activated carbon, after a tank has been completely filled, discharges about 150 mg into the environment in 24 hours. That emission has to be reduced to below 50 mg in accordance with the LEV standard, to below 20 mg in accordance with the ULEV standard (Ultra Low Emission Vehicle) and to 0 mg in accordance with the ZEV standard.

To resolve the above-described problem, additional small activated carbon filters have been developed, which in the stationary, that is to say parked condition of the automobile, absorb those emissions and which are desorbed with clean air during vehicle operation-like the activated carbon loose bed filters discussed above. That additional small activated carbon filter has hitherto been designed in three configurations, more specifically in the form of an activated carbon loose bed filter comprising fine activated carbon granular material, in the form of non-woven fabric which is coated with activated carbon and which is wound up to form a cylinder, or in the form of an activated carbon molded body with a honeycomb structure. Out of those three design configurations, such an activated carbon molded body with a honeycomb structure has the markedly lowest pressure drop. For that reason there is no need for that activated carbon molded body with a honeycomb structure to be shut down during the tank-filling process by means of a valve. That represents a substantial advantage in comparison with an additional small activated carbon loose bed filter comprising fine activated carbon granular material. A further advantage of such an additional small activated carbon filter of the last-mentioned kind with a honeycomb structure is that a correspondingly fine-cell structure provides a markedly greater macroscopic surface area and a higher proportion of activated carbon per unit of volume, than in the case of a non-woven fabric which is coated with activated carbon. An activated carbon molded body with a honeycomb structure therefore represents a so-to-speak ideal solution for the problem described hereinbefore.

U.S. Pat. No. 5,914,294 describes a process for the production of an activated carbon molded body with a honeycomb structure and an activated carbon molded body produced in accordance with that process. Such an activated carbon molded body with a honeycomb structure is also described in the applicants' prior patent application No. 101 04 882.3. Above-mentioned U.S. Pat. No. 5,914,294 states that, for uses in the automobile sector, to achieve the necessary mechanical stability, the proportion of activated carbon is between about 25 and 35% by weight (column 9, lines 4 through 8). In order to produce a filter with such a relatively small proportion of activated carbon, which is suitable for resolving the above-described problem, the filter must be of a certain minimum size. In order to reduce the volume or the weight of the filter, an increase in the proportion of activated carbon would be necessary to achieve the required adsorption properties. That however results in problems in regard to the mechanical load-bearing capability of that known filter. In order to withstand the extreme mechanical loadings in a vehicle the activated carbon molded body with honeycomb structure therefore either has to be of a very stable nature with a certain minimum size, or it has to be mounted in a suitably vibration-damped manner. Furthermore the entire filter has to be optimally sealed off in relation to the environment in order to reliably prevent diffusion effects through very low levels of leakage. Irrespective of their design configuration, all of the above-described known filter systems suffer from problems which cannot be simply disregarded, in terms of complete and homogeneous sealing integrity thereof. In accordance with the ZEV standard no leakage may occur during the entire lifetime, that is to say the period of use of the filter. In that regard the problems relating to sealing integrity involve not only sealing off the filter body in relation to the environment, but in particular also sealing off the connections.

A filter apparatus of the kind set forth in the opening part of this specification with an activated carbon molded body with a honeycomb structure, a connection element at the feed flow end and a connection element at the discharge flow end and a sealing element which sealingly connects the two connection elements and in which the activated carbon molded body is enclosed, wherein the sealing element is formed by a shrink tube in which the activated carbon molded body is shrunk and which is shrunk sealingly on to the connection elements is known from DE 38 38 426 C2. There the activated carbon molded body is formed by monoliths of metal or ceramic. The monoliths are connected to shielding funnel-shaped portions for the exhaust gas feed and discharge connections of an external housing and to each other by means of shielding rings, thus affording a stiff structure. The shrink tube there does not form a sealing element but an assembly aid.

SUMMARY OF THE INVENTION

The object of the present invention is to provide a filter apparatus of the kind set forth in the opening part of this specification with improved filter properties, wherein full-area, homogeneous and optimum sealing of the activated carbon molded body with a honeycomb structure is reliably effected in a simple manner relative to the exterior, that is to say towards the environment, and in particular also towards the connections, while at the same time a good vibration damping effect is achieved.

In accordance with the invention in a filter apparatus of the kind set forth in the opening part of this specification that object is attained in that the activated carbon molded body is definedly spaced from the connection elements so that constricted transitions in the shrunk shrink tube are provided between the activated carbon molded body and the connection elements.

A shrink tube of that kind is inexpensively available, and it can also be processed easily, that is to say using simple means. The filter apparatus according to the invention, with the sealing element which is formed by a shrink tube, enjoys the advantage of ensuring full-area and homogeneous sealing of the activated carbon molded body having a honeycomb structure, in relation to the exterior, and in particular in relation to the connections of the filter apparatus. The constricted transitions of the shrunk shrink tube between the activated carbon molded body and the connection elements provides that the activated carbon molded body is reliably fixed in vibration-damped manner between the connection elements.

The desired characteristics of the vibration damping can be adjusted by the modulus of elasticity of the shrunk shrink tube and/or by the dimensioning of the spacing between the connection elements, that is to say the free constricted connecting portions of the shrunk shrink tube between the connection elements and the activated carbon molded body.

In accordance with the invention flexible adaptation of the filter apparatus according to the invention to installation factors and aspects of a vehicle is possible by the activated carbon molded body having a honeycomb structure comprising at least two activated carbon body portions which are shrunk in mutually spaced relationship in the shrink tube, wherein constricted transitions are formed in the shrunk shrink tube between adjacent activated carbon body portions.

To provide such a filter apparatus according to the invention of the last-mentioned kind, the activated carbon body portions and the two connection elements are introduced into a shrink tube and the shrink tube is shrunk by subjecting it to the action of hot air, in which case the shrink tube bears snugly and sealingly against the activated carbon body portions and the connection elements. A stretching operation is then effected in the still hot condition, that is to say the connection elements are moved away from each other, in which case the activated carbon body portions also move away from each other. In that case constricted concave transitions in the configuration of paraboloids of revolution are produced between the activated carbon body portions. In that case the spacing between the activated carbon body portions can be adjusted by the degree of stretching and by virtue of the overall length of the shrink tube used. The stretched filter apparatus is then quenched with cold air or with cold water so that the shrink tube retains its shape. The flexibility of the filter apparatus according to the invention produced in that way can be adjusted by the modulus of elasticity (E-modulus) of the shrunk shrink tube.

The filter apparatus according to the invention can be used to particular advantage in a tank venting system of a vehicle.

BRIEF DESCRIPTION OF THE DRAWINGS

Further details, features and advantages will be apparent from the description hereinafter of an embodiment of the filter apparatus according to the invention which is diagrammatically shown in the drawing in which.

DETAILED DESCRIPTION OF THE INVENTION

Figure 1:
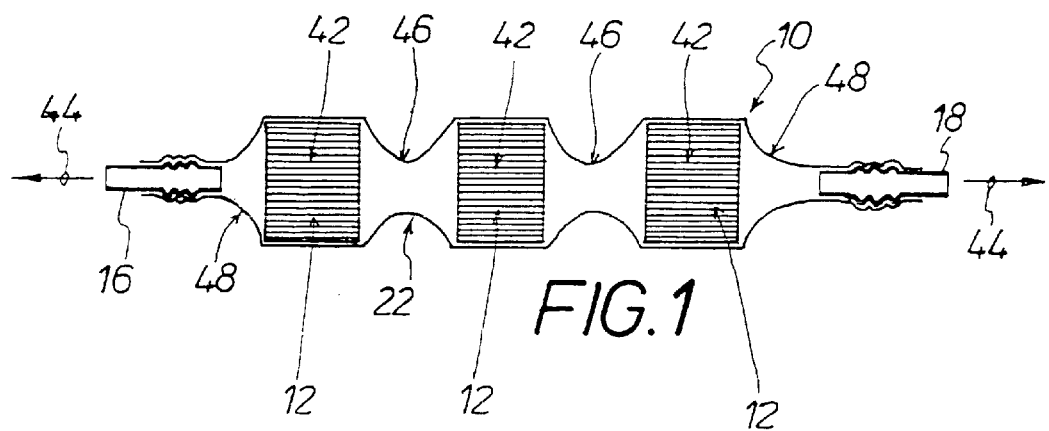
FIG. 1 shows a diagrammatic view of an embodiment of the filter apparatus.

FIG. 1 shows an embodiment of the filter apparatus 10 in which the activated carbon shaped or molded body comprises activated carbon body portions 42 which each involve a honeycomb structure, the passages of which are indicated by thin mutually parallel lines. The activated carbon body portions 42 are spaced from each other by means of the shrunk shrink tube 22. The shrunk shrink tube 22 bears snugly and sealingly against the connection elements 16 and 18 of the filter apparatus 10 and the activated carbon body portions 42. It will be appreciated that it is also possible for the activated carbon molded body not to be divided into a number of activated carbon body portions 42, but to provide only one single activated carbon molded body 12 between the connection elements 16 and 18.

To produce the filter apparatus 10 as shown in FIG. 1 the procedure is as follows: the activated carbon body portions 42 are introduced into the brink tube 22 in the non-shrink original condition thereof. The shrink tube 22 is then subjected to the action of hot air, with the temperature of the hot air being above the shrinkage temperature of the shrink tube 22. Stretching the shrink rube 22 in the still hot condition, that is to say moving the connection elements 16 and 18 away from each other in the direction of the arrows 44 which face away from each other, results in the formation between adjacent activated carbon body portions 42 and between the connection elements 16, 18 and the activated carbon body portions 42 adjacent thereto, of constricted transitions 46 between adjacent activated carbon body portions 42 and constricted transitions 48 between the connection elements 16, 18 and the activated carbon body portions 42 adjacent thereto, wherein the activated carbon body portions 42 are fixed as described relative to each other and relative to the connection elements 16 and 18 after the shrink tube 22, after the stretching operation, is quenched with cold air or with cold water. The constricted transitions 46 form paraboloids of revolution. The constricted transitions 48 form halves of paraboloids of the revolution. The flexibility of the filter apparatus produced in that way can be adjusted by way of the E-modulus of the shrunk shrink tube 22. The spacing between the activated carbon body portions 42 and between the connection elements 16, 18 and the activated carbon body portions 42 adjacent thereto can be adjusted by way of the degree of stretching and by virtue of the overall length of the shrink tube 22 used.

Independently of the respective configuration of the filter apparatus 10, this arrangement ensures homogeneous sealing, over the full area involved, of the activated carbon molded body having a honeycomb structure or the activated carbon body portions having a honeycomb structure, relative to the environment and relative to the connection elements 16 and 18. A quite considerable advantage is afforded by the vibration-damped mounting of the filter apparatus 10 because, with such a vibration-damped mounting arrangement, the mechanical inherent stability of the activated carbon molded body or the activated carbon body portions can be reduced. By virtue of such a reduction in mechanical inherent stability, it is advantageously possible to increase the proportion of activated carbon in the activated carbon molded body or activated carbon body portions, thereby substantially increasing the sorption capacity of the filter apparatus 10. That in turn makes it possible to reduce the volume of the filter apparatus 10. In particular it is possible, with the same afflux flow area, to reduce the filter depth, that is to say the dimension of the filter body between its end faces or the dimensions of the activated carbon body portions 42 between their end faces. That permits flexible adaptation to given installation spaces. Optimum adaptation to the respective situation of installation in a motor vehicle is possible if the activated carbon molded body 12 is subdivided into activated carbon body portions 42 and if they are put into the form of a flexible tube filter. The flexible intermediate spaces between the activated carbon body portions 42 admittedly in turn result in an increase in the overall volume of the filter apparatus 10, but that effect is neutralised again by virtue of the saving in volume in relation to the activated carbon body portions 42 by virtue of the high content of activated carbon, so that overall, while maintaining the total volume of the filter apparatus 10, it is possible to provide a flexible, vibration-damped design structure.

Two embodiments for further illustrating the concept of the invention are described hereinafter, also with reference to FIGS. 2 through 5.

Embodiment 1

An activated carbon molded body with a honeycomb structure which is of a diameter of 2.5 cm, a length of 10 cm and a cell density of 62 cells/cm$^2$ (=400 cpsi) and which was produced in accordance with the process described in above-mentioned prior patent application No 101 04 882.3 has a proportion of activated carbon of 60% by weight, a glass fiber proportion of 5.6% by weight, a clay proportion of 25% by weight and a proportion of glass carbon (carbonised phenol resin) of 7.9% by weight. The combination of the fillers clay and glass fiber in conjunction with the glass carbon skeleton affords an activated carbon molded body which is stable in respect of shape. By virtue of its high activated carbon proportion of 60% by weight however its mechanical stability is less than that of a comparable activated carbon molded body with a honeycomb structure with a maximum of 35% by weight of activated carbon in accordance with above-quoted U.S. Pat. No. 5,914,294. The activated carbon molded body is sealingly connected by means of a shrink tube 22 to two connection elements 16, 18. The shrink tube 22 is a Viton tube with a shrinkage rate of 2:1 at a shrinkage temperature of 175° C.

Figure 2:
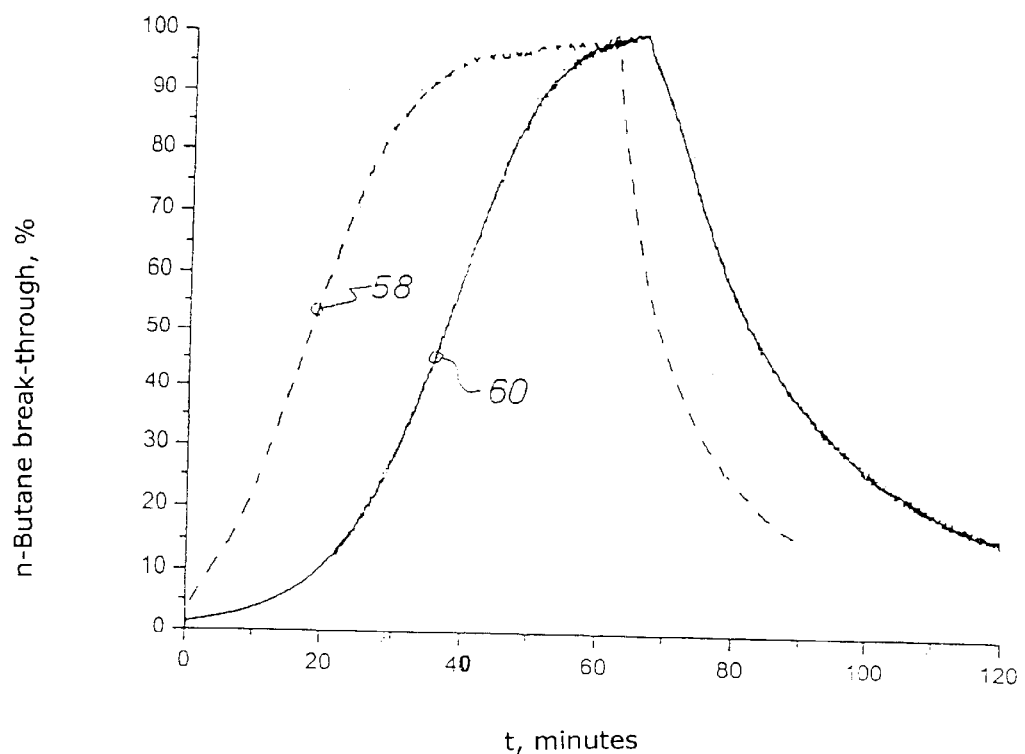
FIG. 2 shows a graph illustrating the n-butane breakthrough curve for an adsorption-desorption cycle of a known activated carbon molded body for example in accordance with above-mentioned U.S. Pat. No. 5,914,294 with a relatively small quantity of activated carbon in comparison with a filter apparatus according to the invention.

FIG. 2 shows the n-butane break-through curve for an adsorption-desorption cycle under the following conditions: afflux flow concentration=80 ppmV n-butane; air humidity=25%; temperature=23° C.; and volume flow=40 l/min. FIG. 2 shows the break-through curve of a filter apparatus according to the invention and a honeycomb body in accordance with U.S. Pat. No. 5,914,294, that is to say with only 35% by weight of activated carbon. The graph clearly shows how greatly the adsorption capacity decreases in relation to n-butane by virtue of the very much lower proportion of activated carbon. In this respect the broken line identified by reference numeral 58 represents the n-butane break-through curve of a known activated carbon body in accordance with U.S. Pat. No. 5,914,294 with a proportion of activated carbon of 35% by weight and the solid line identified by reference numeral 60 denotes the n-butane break-through curve of an activated carbon molded body, of the same size, with a honeycomb structure, with a proportion of activated carbon of 60% by weight.

Figure 3:
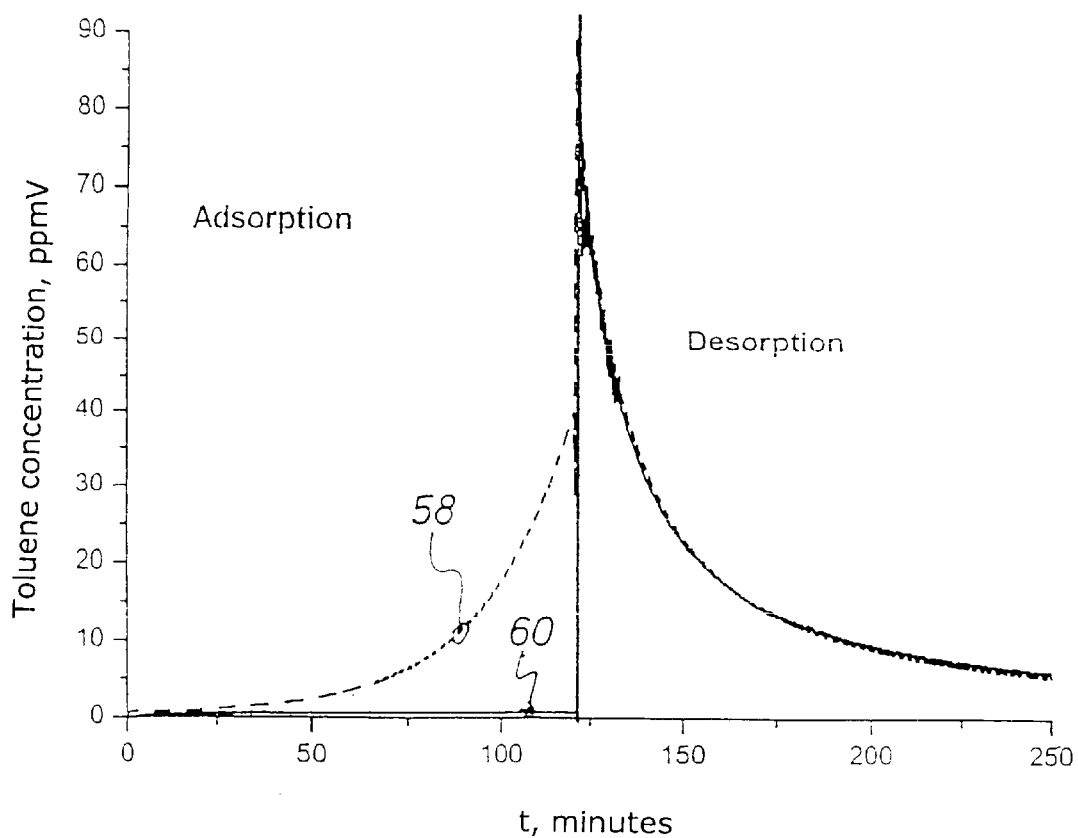
FIG. 3 shows a diagram illustrating the toluene breakthrough curve for an adsorption-desorption cycle of an activated carbon molded body in accordance with U.S. Pat. No. 5,914,294 in comparison with a filter apparatus according to the invention.

FIG. 3 shows the break-through curves of the two above-mentioned filters for a sorption test with toluene. In this sorption test the following parameters were set: afflux flow concentration=80 ppmV of toluene, air humidity=50%; temperature=23°C.; and volume flow=20 l/min in adsorption and 40 l/min in desorption. The solid line identified by reference numeral 60 represents the break-through curve for an adsorption-desorption cycle of a filter apparatus according to the invention with the above-described parameters and the broken line identified by reference numeral 58 represents the corresponding break-through curve of a known activated carbon molded body or honeycomb body in accordance with U.S. Pat. No. 5,914,294 with the above-specified identical dimensions. The curves 58 and 60 make it clear that the difference in terms of sorption capacity is very high even for higher-boiling substances like toluene. While in the case of the filter according to the invention with a proportion of activated carbon of 60% by weight (curve 60), still no significant break-through is to be seen after two hours of loading, the filter with a proportion of activated carbon of 35% by weight is already half saturated, as indicated by the broken line 58.

Embodiment 2

Figure 4:
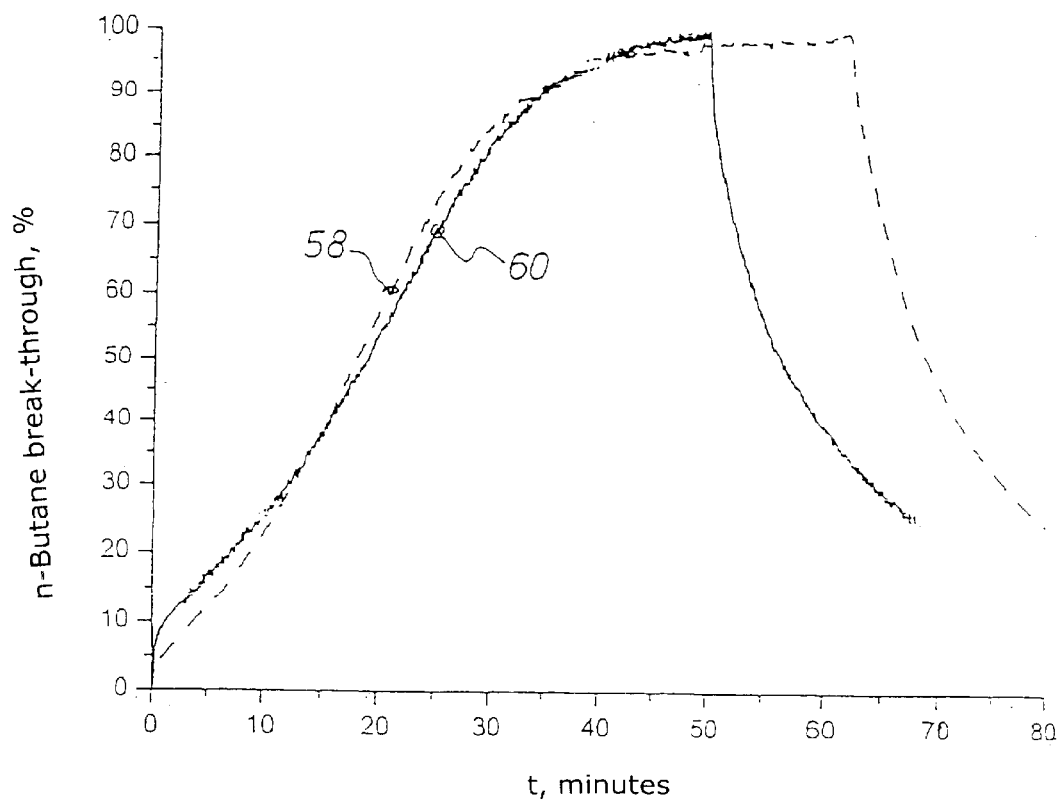
FIG. 4 shows a diagram illustrating the n-butane breakthrough curve of an activated carbon molded body in accordance with U.S. Pat. No. 5,914,294 with 35% by weight activated carbon proportion and of a length of 10 cm in comparison with a filter apparatus according to the invention with an activated carbon molded body of the same honeycomb structure with a proportion of activated carbon of 60% by weight and of a length of only 5 cm.

An activated carbon molded body according to the invention with a proportion of activated carbon of 60% by weight but of a length which is reduced to half, that is to say of a length of 5 cm, and thus being of half the volume, is compared to an activated carbon molded body, that is to say honeycomb body, of the same diameter and of a length of 10 cm in accordance with U.S. Pat. No. 5,914,294, that is to say with a proportion of activated carbon of 35% by weight. The corresponding break-through curves for n-butane are illustrated in FIG. 4. The solid line 60 is the break-through curve of the honeycomb body according to the invention of half the volume with a proportion of activated carbon of 60% by weight and the broken line 58 corresponds to the breakthrough curve 58 shown in FIG. 2. The curves 58 and 60 in FIG. 4 clearly show that, with a correspondingly higher proportion of activated carbon, it is possible to achieve the same adsorption capacity, with a smaller volume.

Figure 5:
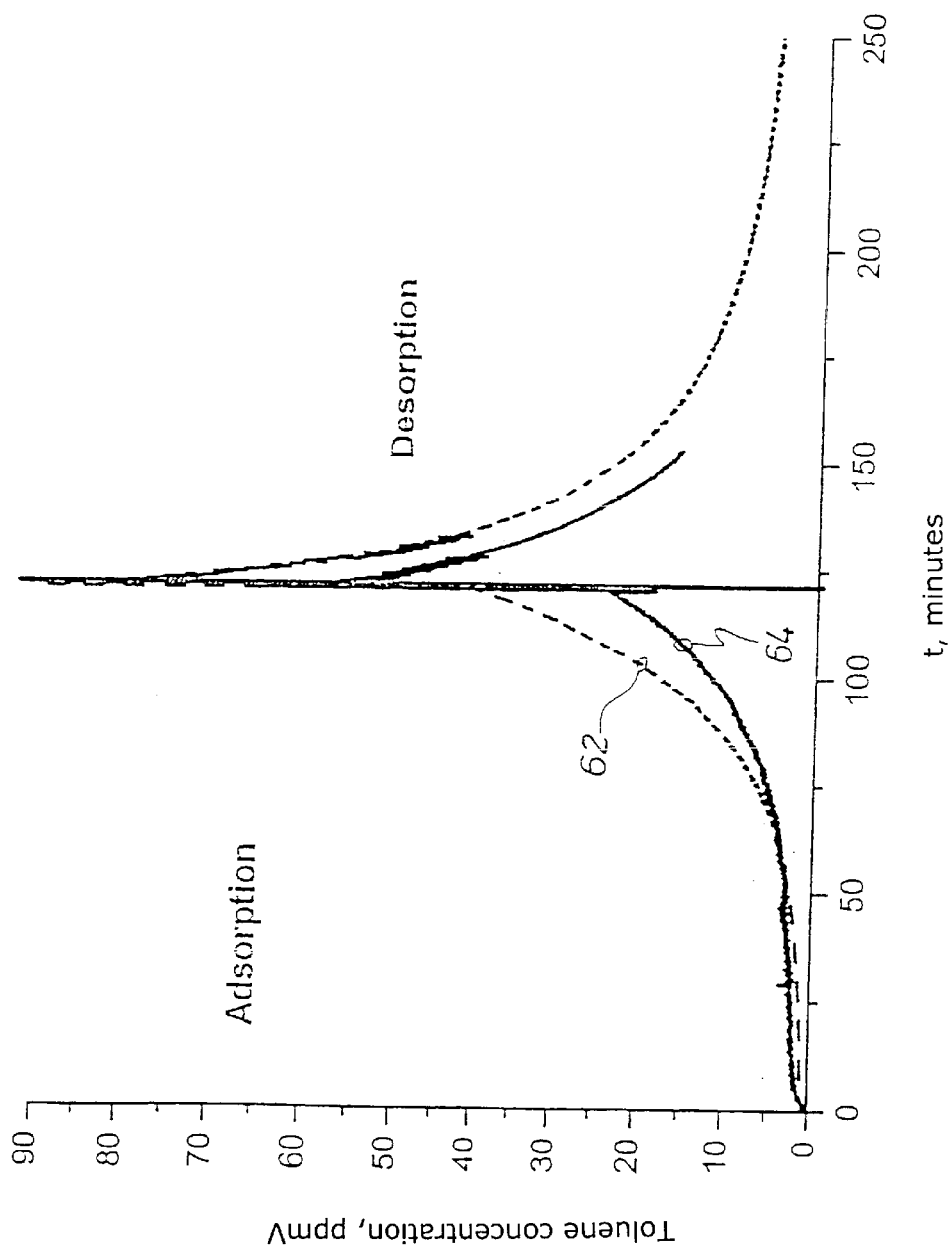
FIG. 5 shows the sorption curves of the two mutually compared filter apparatuses for toluene, the test parameters corresponding to the test parameters shown in FIG. 3.

FIG. 5 shows the sorption curves of the two filter apparatuses described in comparative terms hereinbefore, for toluene. In this respect the test parameters in regard to toluene afflux flow concentration, air humidity, temperature and volume flow in adsorption and in desorption are the same as the test parameters described with reference to FIG. 3. In this case the curve 62 corresponds to a filter length or depth of 5 cm and the curve 64 corresponds to a filter length or depth of 10 cm. It will be apparent from this Figure that the same sorption capacity can be achieved with a markedly smaller filter volume even for higher-boiling gas like toluene.

What is claimed is:

1. A filter apparatus comprising an activated carbon molded body with a honeycomb structure, a connection element at a feed flow end and a connection element at a discharge flow end, and a sealing element which sealingly connects the two connection elements and in which the activated carbon molded body is enclosed, the sealing element being formed by a shrink tube into which the activated carbon molded body is shrunk and which is shrunk sealingly on to the connection elements wherein the activated carbon molded body is definedly spaced from the connection elements so that constricted transitions in the shrunk shrink tube are provided between the activated carbon molded body and the connection elements.

2. A filter apparatus as set forth in claim 1 wherein the activated carbon molded body comprises at least two activated carbon body portions which are shrunk in mutually spaced relationship in the shrink tube, wherein constricted transitions are provided in the shrunk shrink tube between adjacent activated carbon body portions.

3. A tank venting system of a vehicle comprising a filter apparatus as set forth in claim 1.

* * * * *

UNITED STATES PATENT AND TRADEMARK OFFICE
CERTIFICATE OF CORRECTION

PATENT NO. : 6,652,629 B2
DATED : November 25, 2003
INVENTOR(S) : Wolfe et al.

It is certified that error appears in the above-identified patent and that said Letters Patent is hereby corrected as shown below:

Title page,
Item [74], *Attorney, Agent or Firm,* now reads "Hoffman & Baron, LLP", should read -- Hoffmann & Baron, LLP --.

Column 4,
Line 57, now reads "into the brink tube 22" should read -- into the shrink tube 22 --

Signed and Sealed this

First Day of June, 2004

JON W. DUDAS
*Acting Director of the United States Patent and Trademark Office*